Patented Nov. 7, 1950

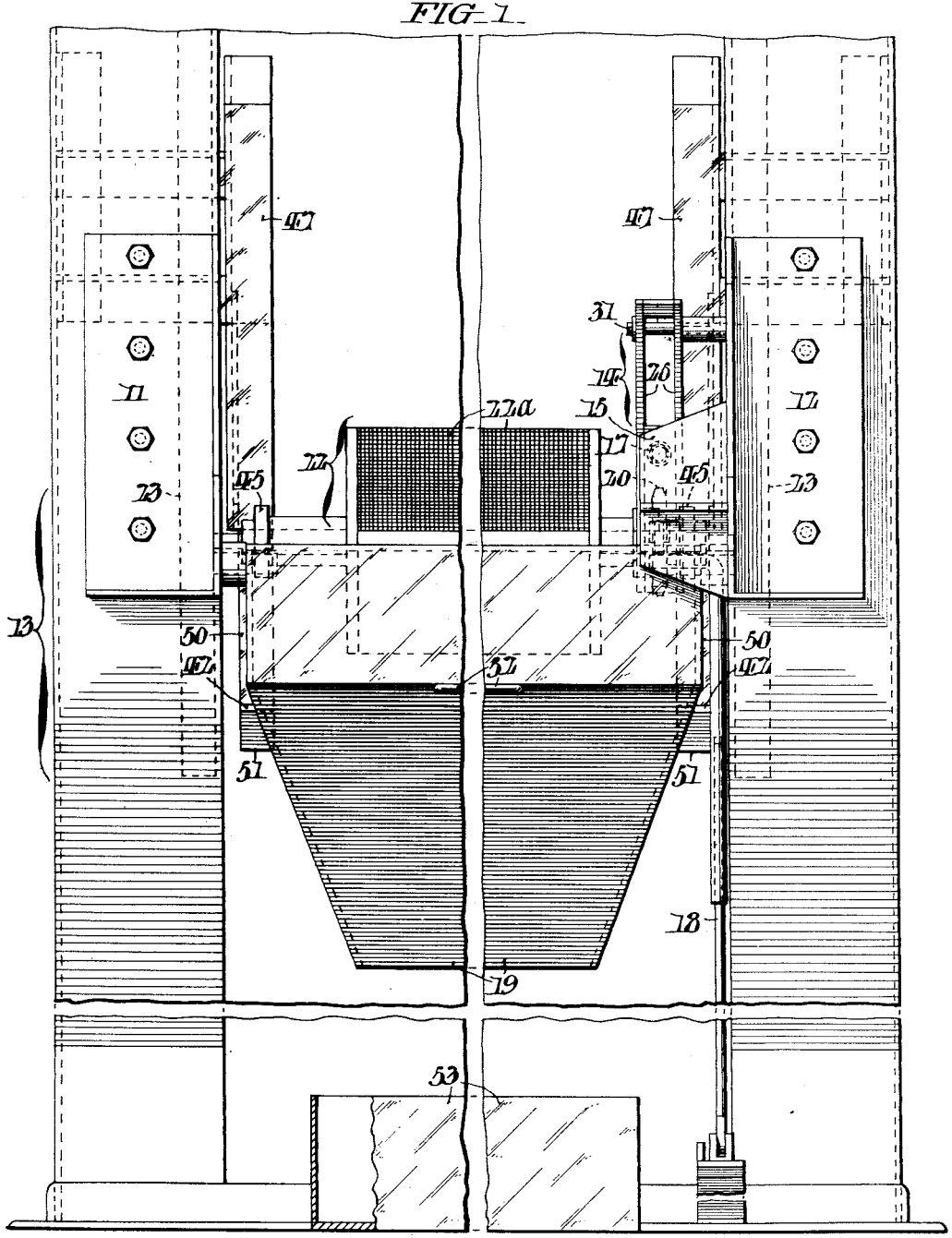

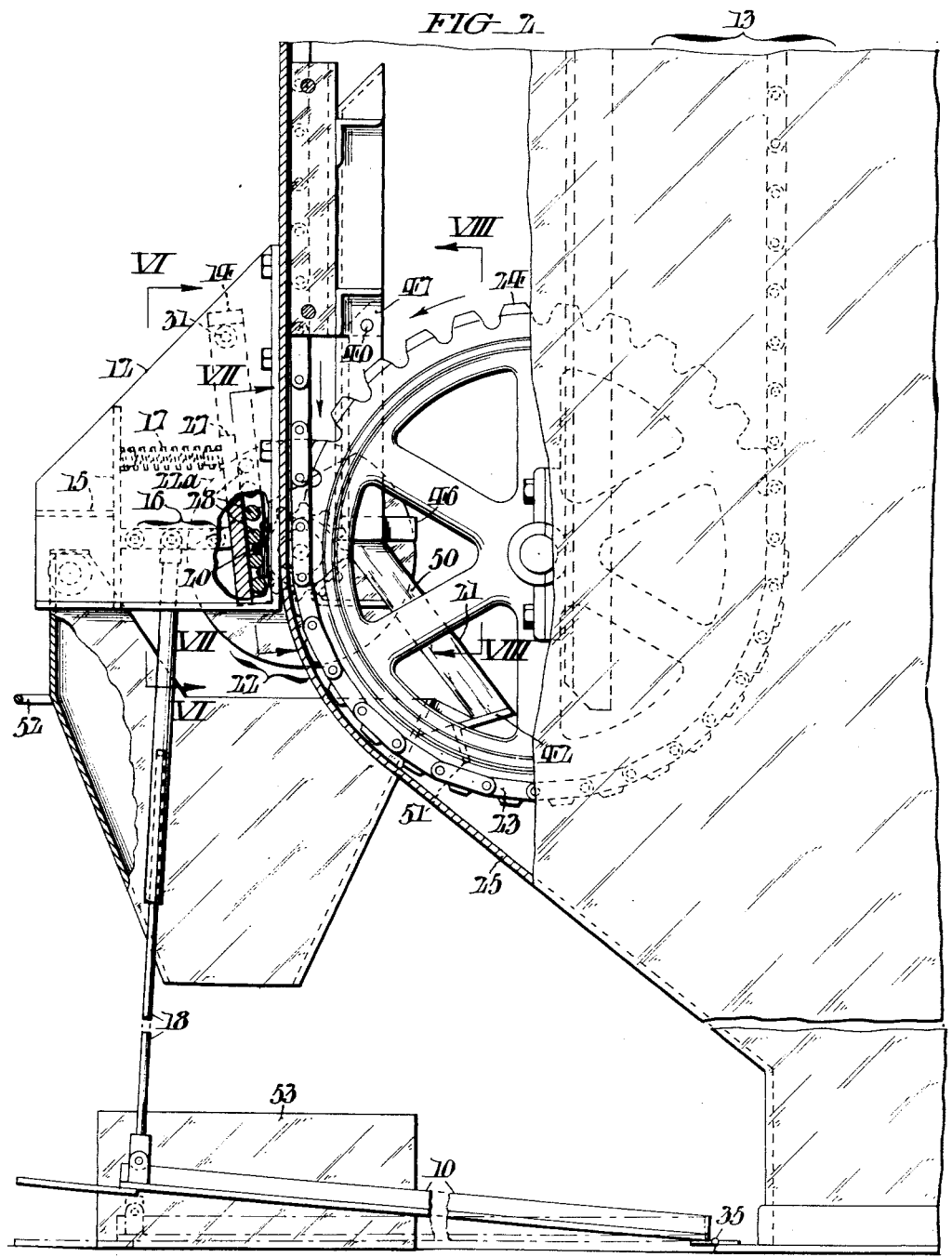

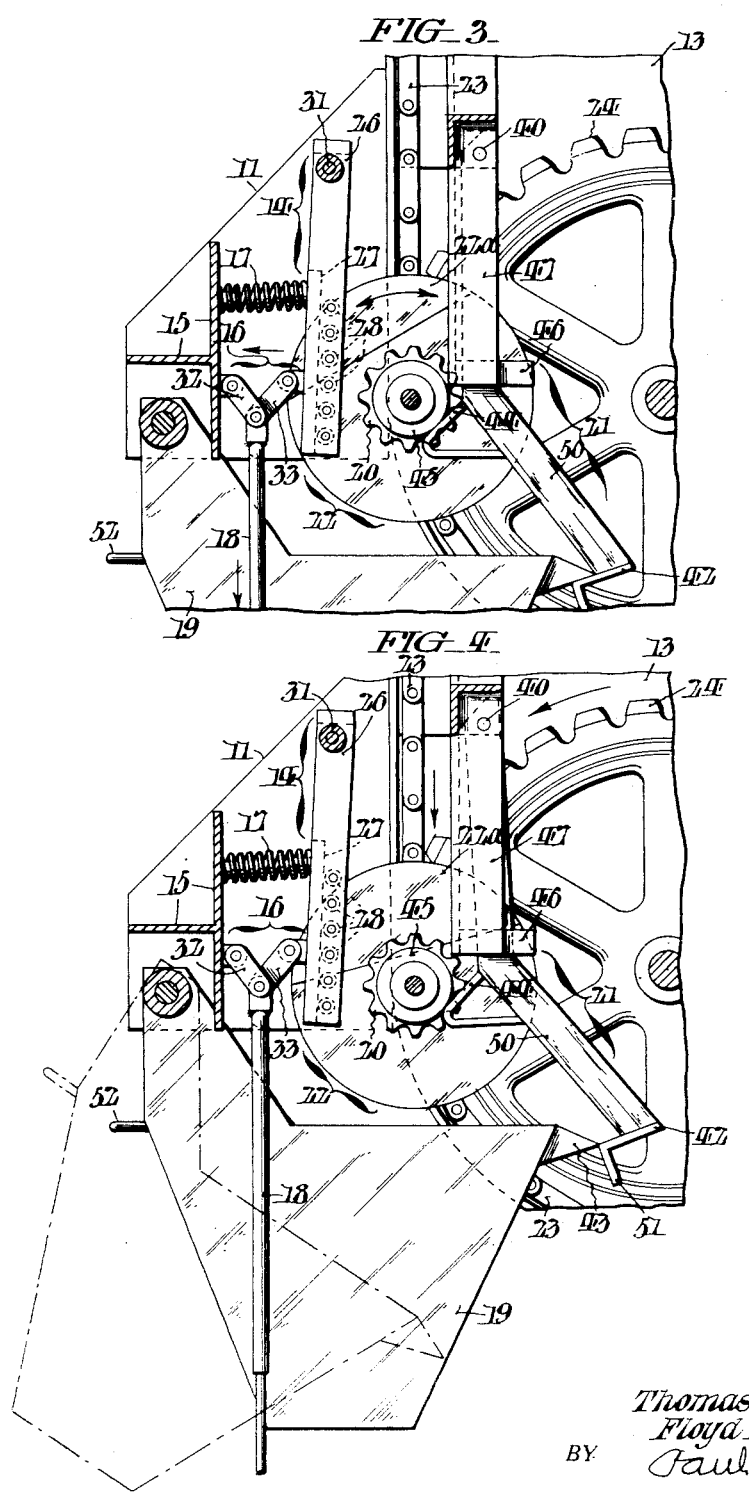

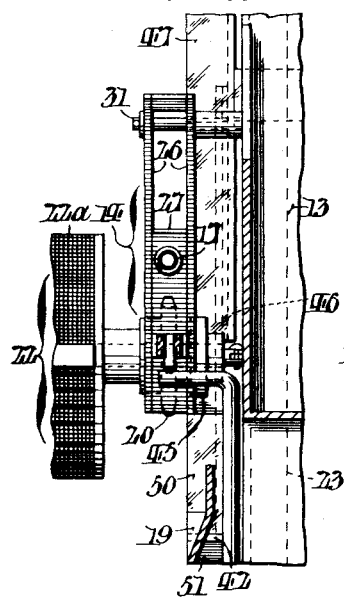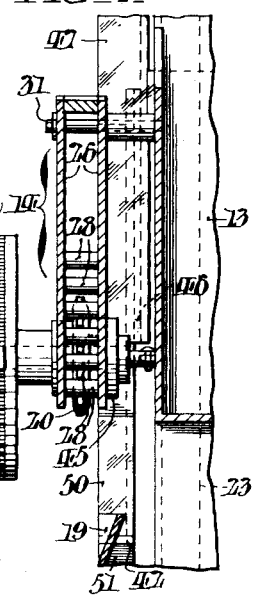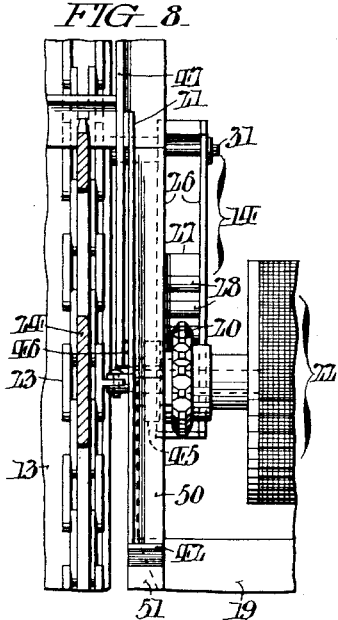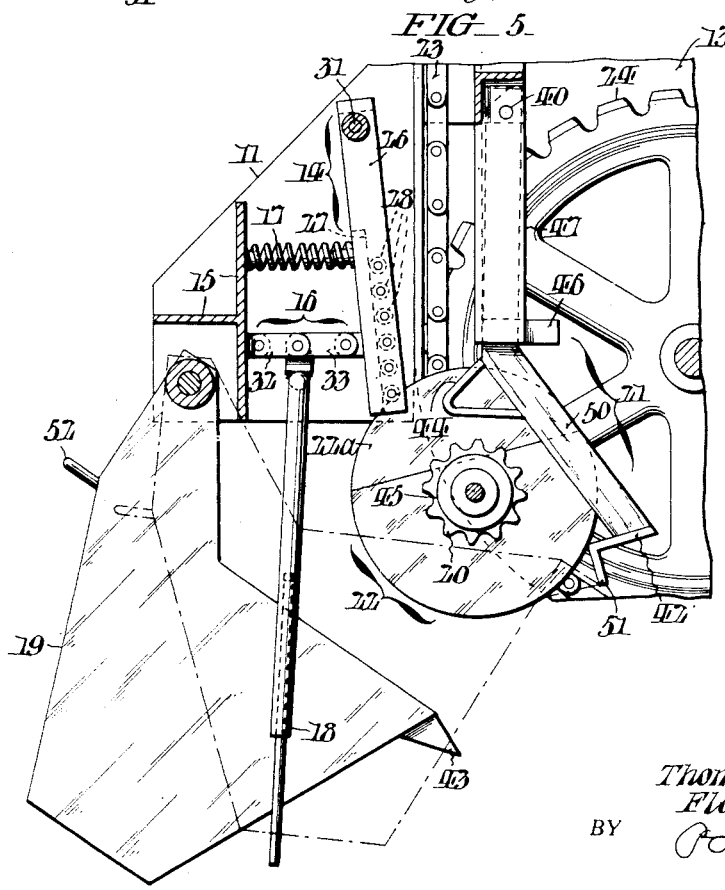

2,529,297

UNITED STATES PATENT OFFICE 2,529,297

MECHANISM FOR LOADING AND UNLOADING

Thomas J. Kearney and Floyd E. McGregor, Detroit, Mich., assignors to Detrex Corporation, Detroit, Mich., a corporation of Michigan Application July 30, 1948, Serial No. 41,672

5 Claims. (Cl. 198—73)

This invention relates generally to a mechanism for loading and unloading containers carried on a conveyor means and more particularly to such a mechanism for a metal degreasing machine.

The prior art shows many devices which include a movable conveyor means having work carriers mounted thereon, and in the operation of these devices the loading and unloading of the carriers with work items consumes much time and labor. The invention described herein has been developed in connection with a metal degreasing machine in which the work carriers are cylindrical and perforated but the benefits of the invention are not limited to such machines. These work carriers with the work items therein are moved through various degreasing stages by means of the conveyor means on which they are mounted. The particular problem toward which this invention is directed is the loading and unloading of work items into and from the cylindrical work carrier, after the work carrier has reached the stop position. Therefore, one advantage of this invention is that it facilitates the loading and unloading of such carriers. Other advantages are economy of construction, simplicity of design and operation and ruggedness of structure. Still other benefits will become apparent from the following detailed description of one form of the invention, reference being had to the accompanying drawings.

Of the drawings, Fig. 1 is a fragmentary end view of a metal degreasing machine equipped with this invention, showing one of the work carriers in its loading and unloading position.

Fig. 2 is a fragmentary side view of Fig. 1, with a portion of the side wall broken away to better disclose important details.

Figs. 3, 4 and 5 are views similar to the showing of Fig. 2 except that they are limited to the details of the operation of the chute catch and release.

Figs. 6, 7 and 8 are fragmentary sectional views taken as indicated by the arrows VI—VI, VII—VII and VIII—VIII in Fig. 2.

In describing the embodiments of this invention shown in the drawings, a specific terminology will be adopted for the purpose of clarity, but it is to be understood that it is not intended thereby to limit the invention to this detailed description of illustrative embodiments thereof. Each term adopted is intended to include all equivalents thereof which operate in a substantially similar manner to accomplish a substantially similar result.

As will appear from the showing in Figs. 1 and 2, this invention comprises generally a pair of brackets 11 and 12 mounted on a degreasing machine comprehensively designated as 13, a rack 14 pivotally mounted on the bracket 12, a bracket 15 mounted on the bracket 12, a toggle mechanism 16 and a coil spring 17 mounted between the bracket 15 and the rack 14, a control rod 18 connected to the toggle mechanism 16, a foot pedal 10 pivotally connected to the control rod 18, a chute 19 pivotally suspended between the brackets 11 and 12, a chute catch 21 pivotally mounted on the degreasing machine 13, and a pinion 20 mounted axially on a work carrier 22.

The degreasing machine 13 having casing 25 may be of any type well known to the art and having cylindrical work carriers 22 rotatably mounted on conveyor chains 23. Of course, this invention would apply also to similar machines in the art other than degreasing machines and therefore the details of the degreasing machine 13 are omitted for the sake of clarity. The conveyor chains 23 engage with sprockets 24 and other similar sprockets mounted in the degreasing machine 13. The movements of the conveyor chains 23 on the sprockets 24 progress the work carriers 22 through the various degreasing stages. As the work carrier 22 reaches the position shown in Figs. 1, 2 and 3, and the roller 45 passes the bottom of the rail 47, it hits a limit switch which shuts off the drive motor and energizes a magnetic brake (not shown) to stop the work carrier 22 for loading and unloading, the drive motor being started again under the control of the operator.

As the work carrier 22 approaches the unloading and loading position, the pinion 20 integrally mounted on the axle of the carrier 22 gradually enters into meshing engagement with the rack 14, see Fig. 2, guided thereto by vertical rail 47. Thus the rack 14 locks the carrier 22 against rotation on its axis while it is stopped for unloading and loading but does not interfere with further downward motion of the carrier 22. The rack 14 comprises side members 26, back member 27 and engagement pins 28 positioned between the side members 26, and it is pivotally mounted on the bracket 12 at 31. The coil spring is mounted between the bracket 15 with sufficient compression to normally urge the rack 14 into engagement with the pinion 20 as shown in Fig. 2. The bracket 15 extends at right angles with the bracket 12 and may be welded thereto.

The levers 32 and 33 pivotally attached to the upper end of the control rod 18 make up the toggle mechanism 16 which is pivotally connected at one end to the bracket 15 and at the other end to the back member 27 of the rack 14. The toggle mechanism 16, being a device well known to the art, will be understood in its operation without further detail. The rod 18 operated by the foot pedal 10, pulls the toggle mechanism 16 downwardly as the operator presses his foot on the foot pedal 10 thereby causing the retraction and disengagement of the rack 14 from the pinion 20 and against the compression force of the spring 17. This permits the manual rotation of the carrier 22 on its axis. The foot pedal 10 is hingedly connected to the base of the degreasing machine 13 at 35. When the operator wishes to rotate the carrier 22 after its cover member 22a is opened in order to discharge its contents by gravity down the chute 19, he merely steps on the foot pedal 10 and manually rotates the carrier 22 to its discharge position. In the same way, the operator positions the carrier 22 for loading and locks it in position by removing his foot from the foot pedal 10. This frees the operator's hands for loading.

When the loading is completed and basket is closed, the machine may then be started without further attention to the locking device since the rack 14 is positioned so that the pinion 20 may move out of engagement therewith as the carrier 22 moves downwardly. This eliminates an added step by the operator in unlocking the carrier 22 on the completion of the loading operation and therefore adds considerably to the operative efficiency of the machine. Further, the operator does not have to concern himself with removing the chute 19 to provide clearance for the downwardly moving carrier 22, as will be explained in detail below. The character of this automatic feature is illustrated in the drawings in operative stages by showing these stages sequentially in Figs. 2–5.

The chute catch 21 is pivotally mounted at 40 on a frame member of the degreasing machine 13. At the bottom end of the chute catch 21 is an engaging element 42 which normally engages the element 43 mounted at one of the upper edges of the chute 19 as shown in Fig. 3. A cam element 44 is also mounted on the chute catch 21 so that its upper surface will enter into cam engagement with cylindrical extension 45 formed axially on the pinion 20. As the work carrier 22 moves downwardly, the cylindrical element 45 enters into a cam action with the cam element 44 and forces the chute catch 21 away from engagement with the element 43 of chute 19 which permits the chute 19 to swing downwardly and outwardly in the position shown in dotted lines in Fig. 4. A fixed guide 46 in sliding contact with the chute catch 21 is mounted on the rail 47 which in turn is mounted on the frame of the degreasing machine 13. The lower portion 50 of the chute catch 21 is formed at an angle with the upper portion thereof so that the engagement element 22 will be in an engaging position when the chute catch 21 hangs normally from its pivotal mounting 40 under the influence of gravity. An element 51 is mounted on the end of the engaging element 42 to enter into a cam engagement with the element 43 as the chute 19 is swung back into place after the carrier 22 has moved out of interference therewith. When the element 43 engages the element 51, the chute catch 21 is pushed back sufficiently to allow the element 43 to slip into locking engagement with the engagement element 42. The operator merely pushes the chute 19 in by the handle 52 and the engagement of chute catch 21 with the chute 19 automatically follows. It should be pointed out that the chute catch 21 is ready for engagement with the chute 19 whenever the carrier 22 is out of interfering relation with the chute 19. That is, whenever the chute 19 is swingable into its operative position, the chute catch 21 is also operatively prepared. The chute 19, when in the operative position, discharges into a tote pan 53 or any suitable receptacle.

While this invention has been described above in considerable detail, it will be obvious to those skilled in the art that various modifications and changes may be made therein without departing from the spirit of the invention as hereinafter claimed.

We claim:

1. In a degreasing machine, a movable conveyor means, a rotatable work carrier mounted on said conveyor means and having an axially mounted pinion, a retractable rack for engaging said pinion, a chute mounted under said work carrier in its loading and unloading position with capacity to swing clear of said work carrier, and means for retracting said rack.

2. The invention of claim 1 characterized further by the fact that said chute is pivotally supported on one side and supported on the other side by a releasable chute catch.

3. The invention of claim 2 characterized further by the fact that said chute catch is released by a cam contact with said work carrier whereby said chute catch is swung out of engagement with said chute as said carrier moves toward said chute.

4. The invention of claim 3 characterized further by the fact that said chute catch has a cam element at its lower end for cam engagement with said chute to assist locking engagement therewith.

5. The invention of claim 4 characterized further by the fact that said cam contact between said chute catch and said work carrier is effected by a cam cylinder axially mounted adjacent to said pinion mounted on said carrier.

THOMAS J. KEARNEY.
FLOYD E. McGREGOR.

REFERENCES CITED

The following references are of record in the file of this patent:

UNITED STATES PATENTS

| Number | Name | Date |
| --- | --- | --- |
| 734,063 | Hauck | July 21, 1903 |
| 1,373,736 | Jahnke | Apr. 5, 1921 |
| 1,583,450 | Frederick | May 4, 1926 |
| 1,855,540 | Baker | Apr. 26, 1932 |